United States Patent [19]
Kishida

[11] Patent Number: 5,287,418
[45] Date of Patent: Feb. 15, 1994

[54] METHOD AND APPARATUS FOR PRODUCING A CORRECTED IMAGE FROM AN ORIGINAL IMAGE

[75] Inventor: Yoshihiro Kishida, Kyoto, Japan

[73] Assignee: Dainippon Screen Mfg. Co., Ltd., Japan

[21] Appl. No.: 933,967

[22] Filed: Aug. 24, 1992

Related U.S. Application Data

[63] Continuation of Ser. No. 603,540, Oct. 25, 1990, abandoned.

[30] Foreign Application Priority Data

Oct. 25, 1989 [JP] Japan ............................. 1-277396

[51] Int. Cl.⁵ ............................................. G06K 9/38
[52] U.S. Cl. ....................................... 382/50; 382/54; 358/527; 358/466
[58] Field of Search ............... 382/50, 54, 6, 78; 358/80, 465, 466; 356/402; 364/526; H04/1/46

[56] References Cited

U.S. PATENT DOCUMENTS

3,893,166 7/1975 Pugsley ................................ 358/80
4,488,245 12/1984 Dalke et al. ........................ 364/526

*Primary Examiner*—Joseph Mancuso
*Attorney, Agent, or Firm*—Ostrolenk, Faber, Gerb & Soffen

[57] ABSTRACT

A plurality of reference tone curves are determined in advance. An operator divides an original image into image regions and selects respective reference tone curves ($f_1(x)$, $f_2(x)$) for the image regions. The operator designates weight values for the respective reference tone curves. A weighted average of the respective reference tone values is calculated with the weight values to obtain a tone curve which is then employed to convert the gradation of the original image.

23 Claims, 7 Drawing Sheets

| PORTRAIT (HIGH KEY) | PORTRAIT (STANDARD) | PORTRAIT (LOW KEY) | --- |
| MACHINE (HIGH KEY) | MACHINE (STANDARD) | MACHINE (LOW KEY) | --- |
| LANDSCAPE (HIGH KEY) | LANDSCAPE (STANDARD) | LANDSCAPE (LOW KEY) | --- |
| --- | --- | --- | --- |

METHOD AND APPARATUS FOR PRODUCING A CORRECTED IMAGE FROM AN ORIGINAL IMAGE

This is a continuation of application Ser. No. 07/603,540, filed on Oct. 25, 1990 now abandoned.

BACKGROUND OF THE INVENTION

1. Field of the Invention

The present invention relates to a method of and an apparatus for obtaining a tone curve or a tone conversion curve used for executing tone conversion of image data which are obtained by reading an original image.

2. Description of Background Art

In an image processor such as a color scanner, tone conversion is conducted on image data which are obtained by reading an original image by photoelectric scanning thereof. Thereby a recorded image having required tone expression is obtained. For such tone conversion, it is preferred not to employ a fixed tone curve but to employ a tone curve in accordance with the characteristic of the original image to be processed. However, for producing an appropriate tone curve for each original, the structure of the image processor is liable to become complicated to some extent.

Efforts have been made to develop a simple to use and construct technique for obtaining tone conversion or gradation conversion tables in accordance with the characteristics of each original. For example, in the technique disclosed in Japanese Laid-Open Application Laid-Open No. 63-42575 (1988), a required tone curve is obtained by combining a tone curve determined according to a density histogram of the whole image and a reference tone curve prepared in advance, in accordance with an arbitrary combination ratio.

However, for particularly appropriate expression of the tone of a partial region in the original image, the tone curve produced by the aforesaid technique is sometimes inadequate. When the color tone of the partial image region whose tone is desired to be expressed appropriately is widely different from the color tone of the whole image, the tone expression of the partial image region might not meet the requirement, because the tone curve is obtained according to the density histogram of the whole image in the aforesaid technique.

SUMMARY OF THE INVENTION

The present invention is directed to a method of obtaining a tone curve which can be employed for converting a gradation of an image.

According to the present invention, the method comprises the steps of: (a) obtaining a plurality of reference tone curves for a plurality of gradation characters, respectively; (b) designating a plurality of image regions on the original image; (c) selecting respective reference tone curves for the image regions designated among the plurality of reference tone curves; (d) designating weight values for the respective reference tone curves; and (e) combining the respective reference tone curves in cooperation with the weight values to thereby obtain the tone curve.

The weight values may be arbitrarily designated, or alternately, they may be determined on the basis of the ratio between respective areas of the plurality of image regions. The plurality of image regions can be designated by moving a cursor on the image displayed.

Preferably, the plurality of reference tone curves are prepared for various types of objects appearing on images. The designation of respective reference tone curves for the plurality of image regions may be attained by selecting the types of objects appearing on the image.

In an aspect of the present invention, the respective tone curves for the plurality of image regions are obtained on the basis of the statistical distributions of density on the plurality of image regions.

The present invention also provides an apparatus for conducting the method of the present invention.

Since the tone curve for converting the gradation of the image is obtained by combining reference tone curves assigned to respective image regions, the reference tone curve for a selected image region can be reflected to the tone curve at a desired weight.

Accordingly, an object of the present invention is to provide a method of and an apparatus for obtaining a tone curve suitable for expressing the gradation of a selected image region more appropriately than other image regions.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Schematic Structure of System

Figure 1:
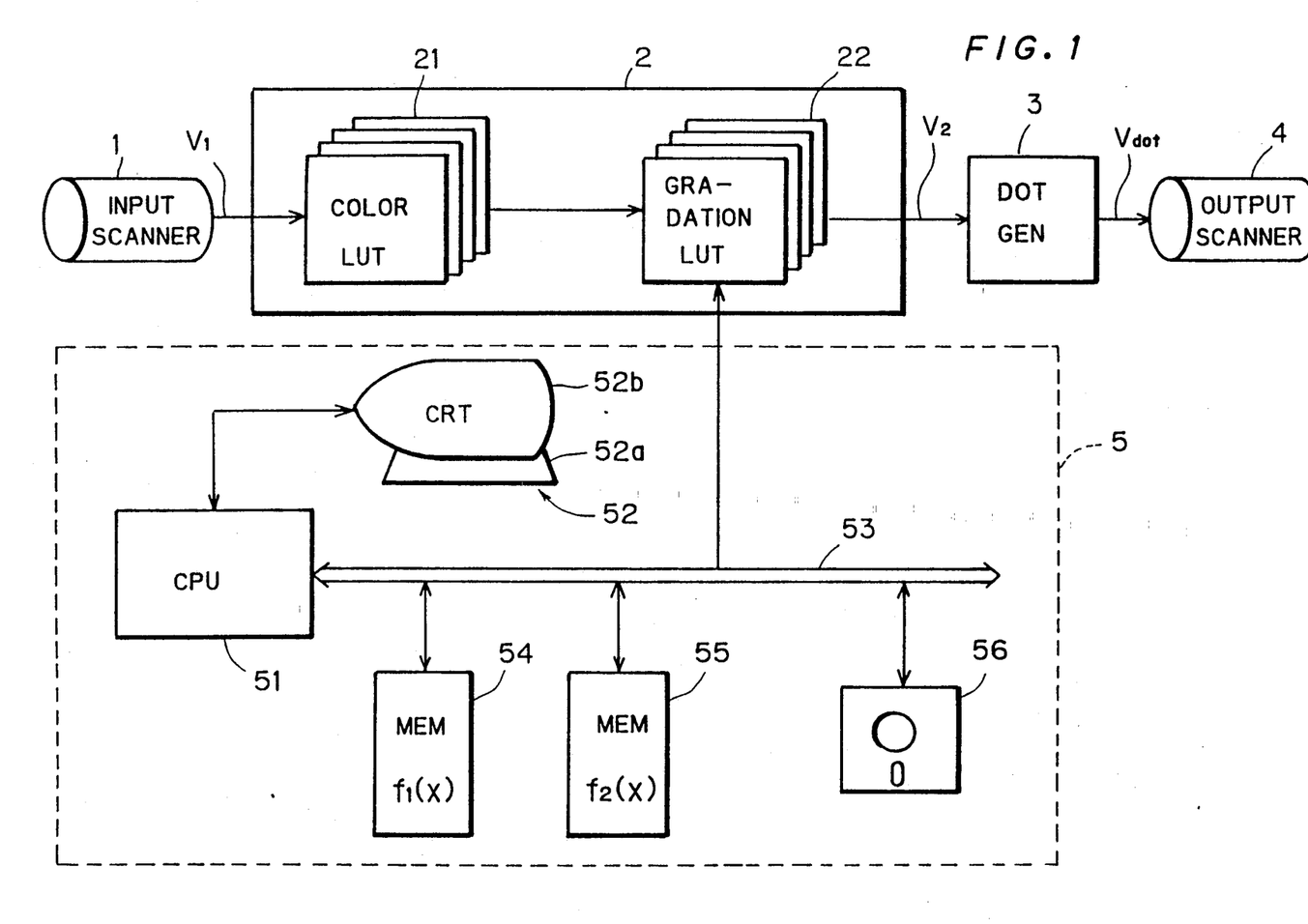
FIG. 1 is a schematic structural diagram showing a scanner system according to a preferred embodiment of the present invention.

FIG. 1 is a block diagram of a color scanner system according to a preferred embodiment of the present invention. In FIG. 1, an input scanner 1 scans an original to read an image thereof and supplies an image signal $V_1$ to an image processing circuit 2. The image processing circuit 2 comprises a color computation lookup table 21 for executing color computation by which BGR components of the image signal $V_1$ are converted into YMCK components, a gradation lookup table (hereinafter referred to as a gradation LUT) 22 for executing tone conversion, and the like. An image signal $V_2$ obtained by the image processing circuit 2 is supplied to a dot generator or a halftone dot signal generating circuit 3 for being converted into a halftone dot signal $V_{dot}$ therein. The halftone dot signal $V_{dot}$ is supplied from the dot generator 3 to an output scanner 4, which exposes a photosensitive film based on this signal and records each color-separated image thereon.

The scanner system further comprises a tone curve setting device 5 for setting an appropriate tone curve in accordance with the character of the original image. The tone curve setting device 5 comprises a CPU 51, a console 52 which is connected to the CPU 51 and has a keyboard 52a and a CRT 52b. Two memories 54 and 55 are connected to the CPU 51 by way of a CPU bus 53. Data can be transmitted between the CPU 51 and a floppy disc 56 by way of the CPU bus 53. The tone curve which is obtained by the tone curve setting device 5 is supplied in the form of a lookup table by way of the CPU bus 53 to the gradation LUT 22 to be stored therein.

B. Operation of the System

Figure 2:
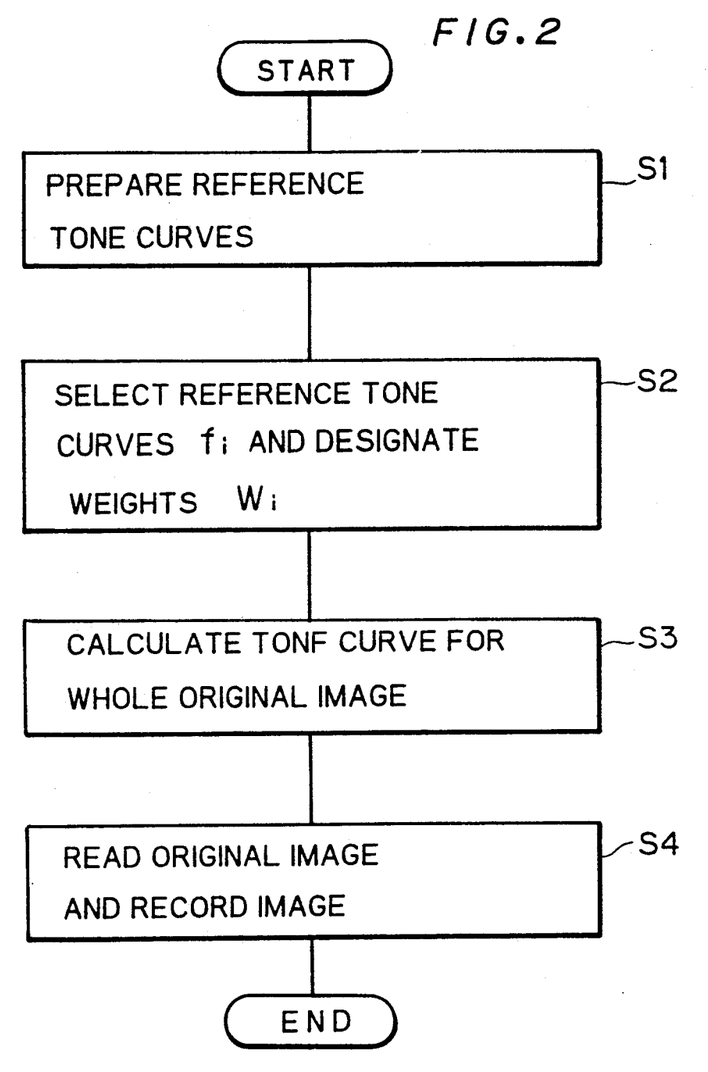
FIG. 2 is a flow chart showing the procedure of the preferred embodiment.

FIG. 2 is a flow chart showing the procedure according to the preferred embodiment of the present invention.

In step S1, a plurality of reference tone curves for different tone characteristics are prepared and stored in the floppy disc 56.

Figure 3:
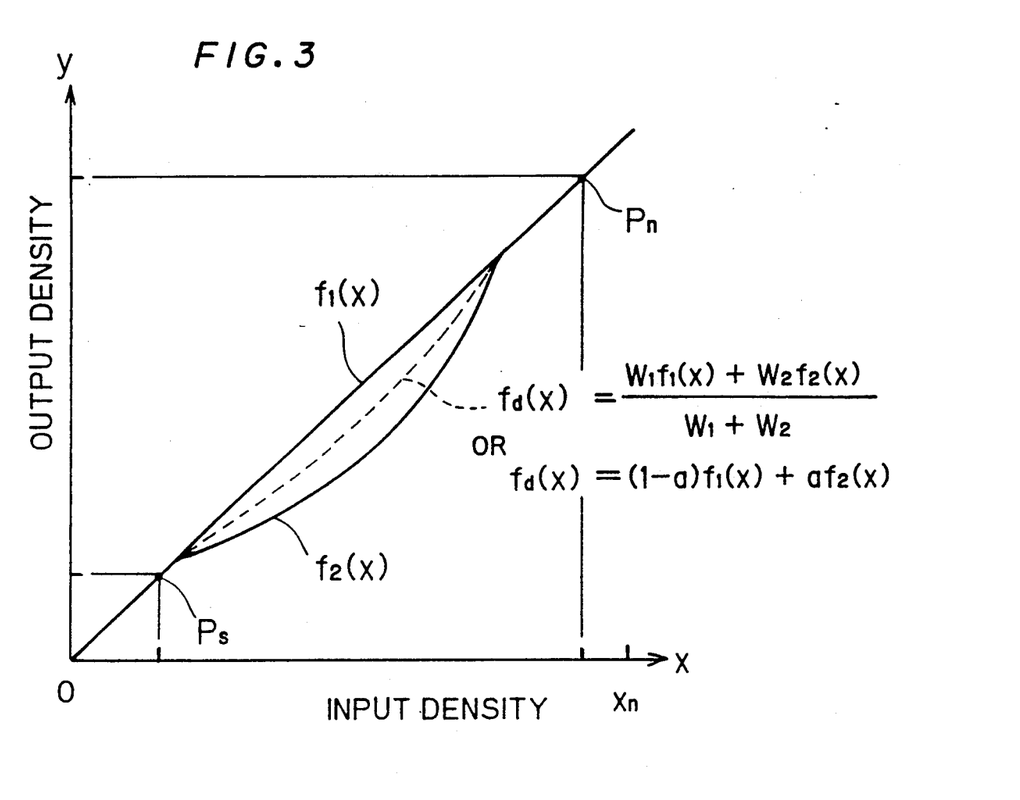
FIG. 3 shows exemplary tone curves.

FIG. 3 shows exemplary reference tone curves. The abscissa thereof indicates an input density (or a density before the tone conversion) x and the ordinate indicates an output density (or a density after the tone conversion) y. Two reference tone curves $f_1(x)$ and $f_2(x)$ are shown in FIG. 3.

The tone curves are in general adjustable to form various shapes between a shadow point $P_s$ and a highlight point $P_h$, which shapes express tone reproduction characteristics. As reference tone curves, a plurality of curves and prepared in accordance with various tone characteristics of the images having different image pictures (portraits, machines, landscapes, etc.) and different tones (high keys, low keys, etc.).

Figure 4:
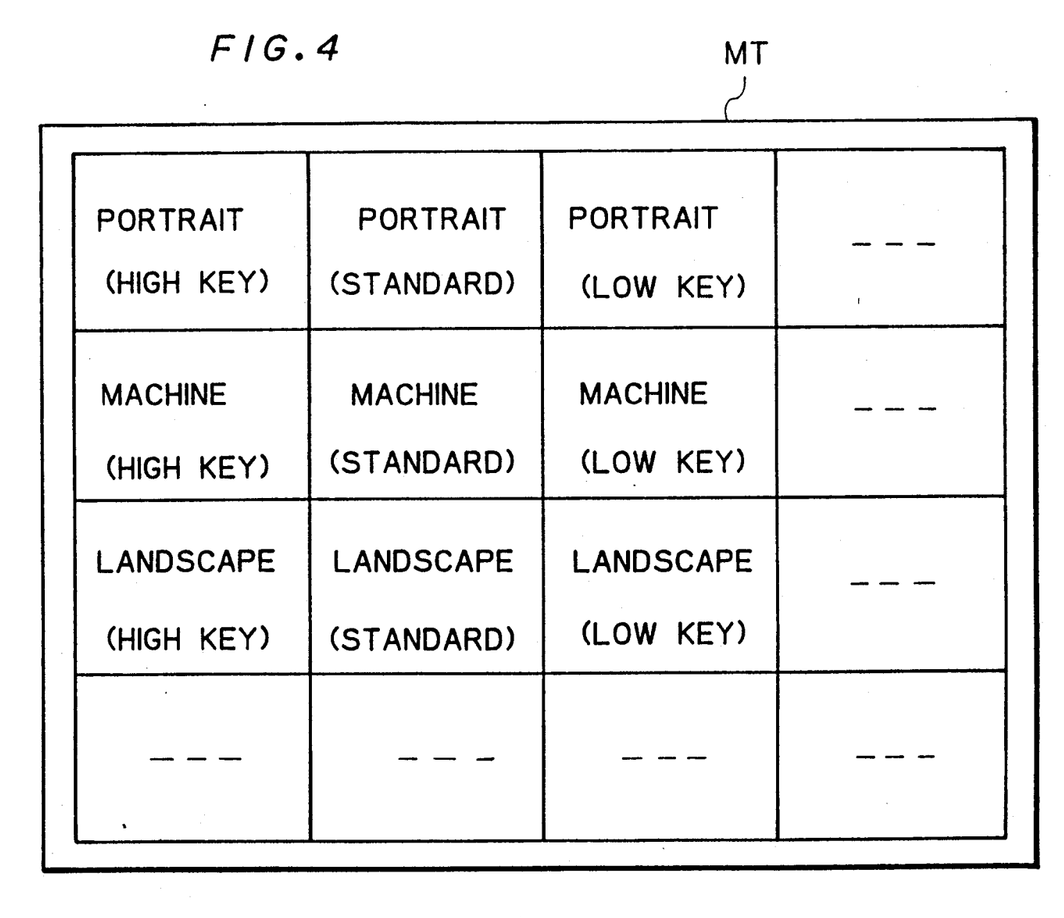
FIG. 4 shows an example of a menu table.

In step S2, an operator observes the original image on which the tone conversion is to be conducted, and thereby specifies a plurality of reference tone curves $f_i$ to be employed for setting the tone curve appropriate to the original image and the values of weights $W_i$ for these reference tone curves, respectively. FIG. 4 shows an example of a menu table MT employed for specifying the reference tone curves to be employed. In the menu table MT, items for different image pictures (portraits, machines, landscapes, etc. ) and different tones (high keys, low keys, etc.) are arranged. The menu table is displayed, for example, on the CRT 52b. The operator moves a cursor to select a plurality of items corresponding to the contents of the original image, to thereby select the reference tone curves $f_i$ in accordance with the tone characteristics of the items being selected. The weights $W_i$ for the respective reference tone curves are inputted by means of the keyboard 52a.

Figure 5:
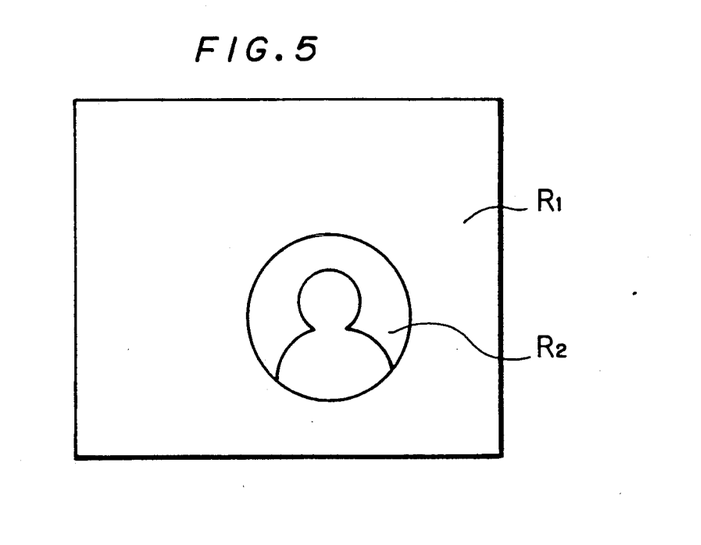
FIG. 5 shows an example of an original image.

FIG. 5 shows an example of the original image. For simplification, the original image is assumed to be separable into two: a background image region $R_1$ and a main subject image region $R_2$ which is located in the background region $R_1$ and has weak gradation. The regions $R_1$ and $R_2$ may be designated by tracing the boundary between them with a cursor on the CRT 52b. A first reference tone curve $f_1(x)$ suited to the background region $R_1$ and a second reference tone curve $f_2(x)$ suited to the main subject region $R_2$ are supposed to be selected. The data indicating the reference tone curves $f_1(x)$ and $f_2(x)$ are read out from the floppy disc 56 to be stored in the memories 54 and 55 respectively. The weights $W_1$ and $W_2$ for the reference tone curves $f_1(x)$ and $f_2(x)$ are designated by the operator through the console 52.

In step S3, the CPU 51 calculates the tone curve $f_d(x)$ appropriate to the original image according to the following equation:

$$f_d(x) = \{W_1 f_1(x) + W_2 f_2(x)\}/(W_1 + W_2) \quad (1)$$

where $0 \leq x \leq x_n$, $x_n$ designating the maximum value of the input density.

Instead of designating the weights $W_1$ and $W_2$ of step S2, one tone curve (for example, $f_1(x)$) to which processing priority is given between two reference tone curves $f_1(x)$ and $f_2(x)$ and the weight $W_2 = a$ for the other tone curve $f_2(x)$ may be designated. In this case, the tone curve $f_d(x)$ appropriate to the original image is calculated according to the following equation instead of Equation (1):

$$f_d(x) = (1-a)f_1(x) + af_2(x) \quad (2)$$

where $0 < a < 1$.

In FIG. 3, the tone curve $f_d(x)$ calculated according to Equation (1) or (2) is shown by a broken line. The tone curve $f_d(x)$ is an average of the first and second reference tone curves $f_1(x)$ and $f_2(x)$ weighted with the respective weights $W_1$ and $W_2$, as is understood from Equation (1). By varying the values of the weights $W_1$ and $W_2$, the tone curve $f_d(x)$ having a tone expression characteristic which is closer either the first or second reference tone curve $f_1(x)$ or $f_2(x)$ can be obtained. For example, in the case of expressing the tone of the background region $R_1$ more appropriately than the main objective region $R_2$, the weight $W_1$ for the first reference tone curve $f_1(x)$ is set to a large value and the weight $W_2$ or a for the second reference tone curve $f_2(x)$ is set to a small value.

The first and second reference tone curves $f_1(x)$ and $f_2(x)$ may be different for each color component Y, M, C and K to calculate the appropriate tone curve $f_d(x)$ for each color component.

After the tone curve $f_d(x)$ which expresses the tone of a partial image region in the original is calculated by the CPU 51, data of the tone curve $f_d(x)$ is supplied from the CPU 51 to the gradation LUT 22 to be stored therein in the form of a lookup table.

In step S4, the original is set to the input scanner 1 to read the image thereof. The image signal $V_1$ is processed by the image processing circuit 2 and the dot generator 3, and color-separated halftone dot images for Y, M, C and K are recorded on the photosensitive film by the output scanner 4. At this time, the tone conversion is conducted through the tone curve $f_d(x)$ stored in the gradation LUT 22, whereby the color-separated images having the required tone characteristic is obtained.

The process may be modified such that the image obtained through the tone conversion is displayed on a monitor display and the operator changes the choice of the reference tone curves and the weights while observing the image displayed.

C. Other Preferred Embodiments

Figure 6:
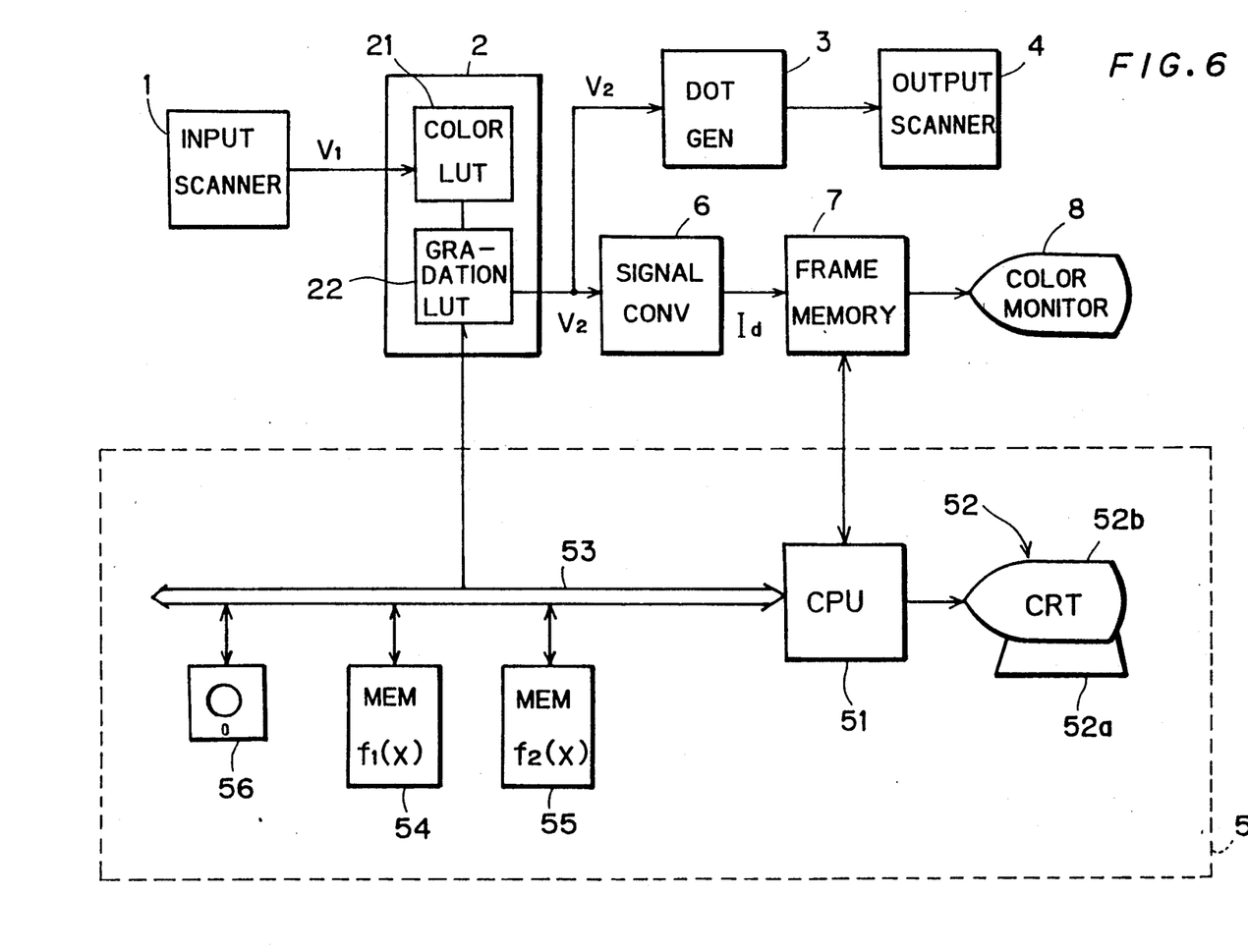
FIG. 6 is a schematic block diagram showing a scanner according to another preferred embodiment of the present invention.

FIG. 6 is a block diagram of a color scanner system according another preferred embodiment of the present invention. The scanner system comprises a signal converter 6, a frame memory 7 and a color monitor 8 in addition to the elements of the scanner system in FIG.

1. The signal converter 6 converts the image signal $V_2$ outputted from the image processing circuit 2 into luminance data $I_d$ for each pixel. The luminance data $I_d$ are stored in the frame memory 7 and, as required, are supplied from the frame memory 7 to the color monitor 8 to display the original image on the color monitor 8.

Figure 7:
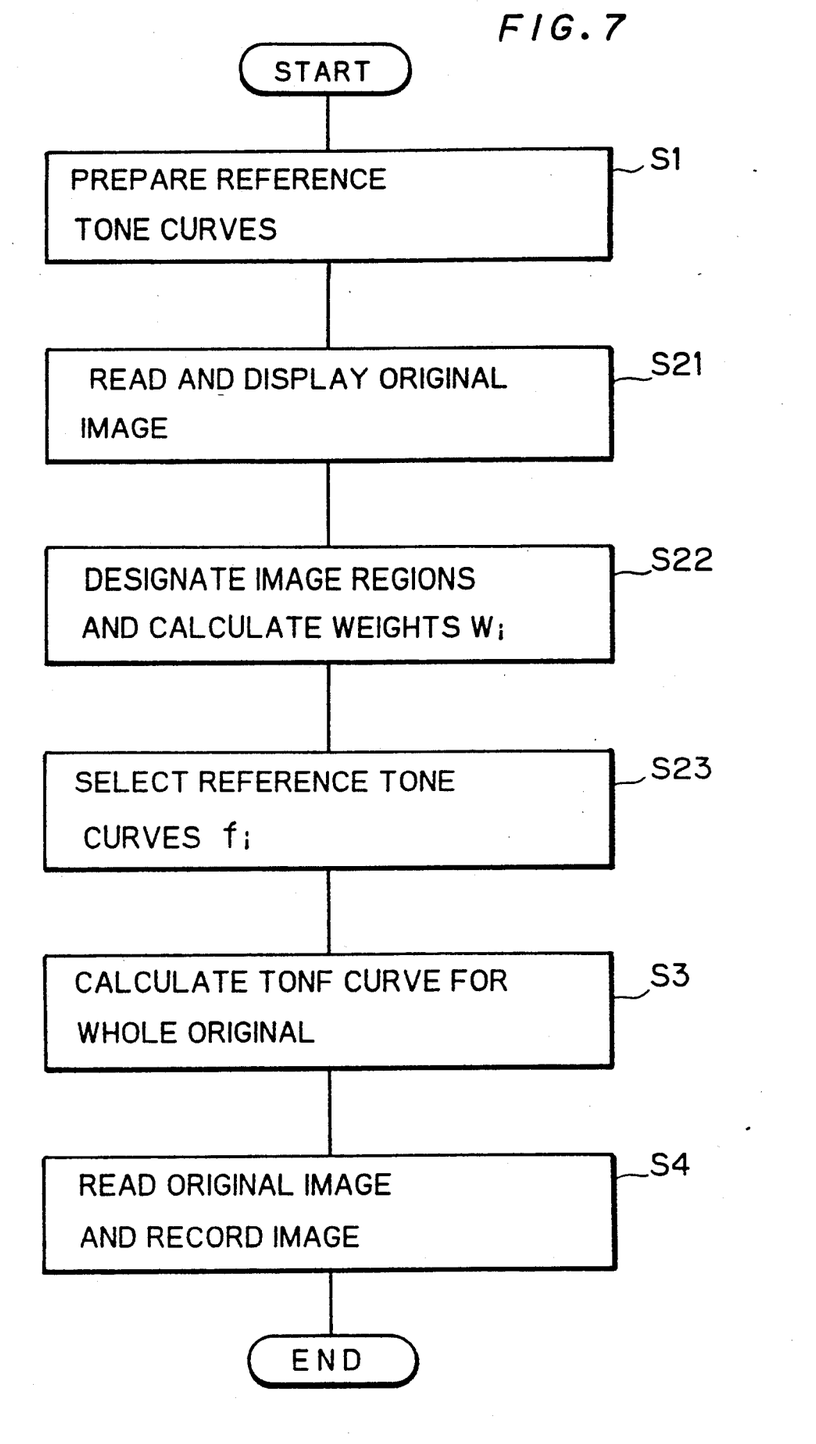
FIG. 7 is a flow chart showing the procedure of the embodiment of FIG. 6.

FIG. 7 is a flow chart showing the procedure of the embodiment using the scanner system of FIG. 6. In FIG. 7, the process steps S1, S3 and S4 are similar to those of FIG. 2. Instead of the process step S2 of FIG. 2, steps S21 through S23 are executed.

In step S21, the input scanner 1 reads the original image, and the color monitor 8 displays the original image.

In step S22, the operator specifies the positions and sizes of the image regions $R_1$ and $R_2$ in the original image. For example, the operator specifies the center position of the image region $R_2$ while moving the cursor on the screen of the color monitor 8 by means of a mouse and the like, and specifies the radius value of the image region $R_2$ by means of a keyboard and the like. As a result, the inside of the circle defined by the specified center position and radius is specified as the image region $R_2$. Alternatively, the image region $R_2$ may be specified by tracing the contour line of the image region $R_2$ by means of a stylus pen and the like. The CPU 51 calculates the ratio $A_2:A_1$ of the area $A_2$ of the image region $R_2$ to the area $A_1$ of the background region $R_1$, and the weights $W_1$ and $W_2$ in Equation (1) or the weight a in Equation (2) are determined such that the equality $W_2:W_1=A_2:A_1$ or $1:a=A_2:A_1$ holds. Alternatively, the ratio $A_2:(A_1+A_2)$ of the area $A_2$ of the image region $R_2$ to the area $(A_1+A_2)$ of the whole original image may be used for determining the weights $W_1$ and $W_2$ (or a).

In step S23, the reference tone curves $f_i$ appropriate to the respective regions in the original are selected. The selection is executed in the same manner as the selection of the reference tone curves in the process step S2 of FIG. 2.

If the weights $W_i$ (or a) are determined according to the area ratio of the image regions $R_1$ and $R_2$ in the original image, as described above, even an unskilled operator can obtain the tone curve $f_d(x)$ appropriate to the original easily. Besides, the operator can easily the weights $W_1$ and $W_2$ to appropriate values while observing the monitor image.

Figure 8:
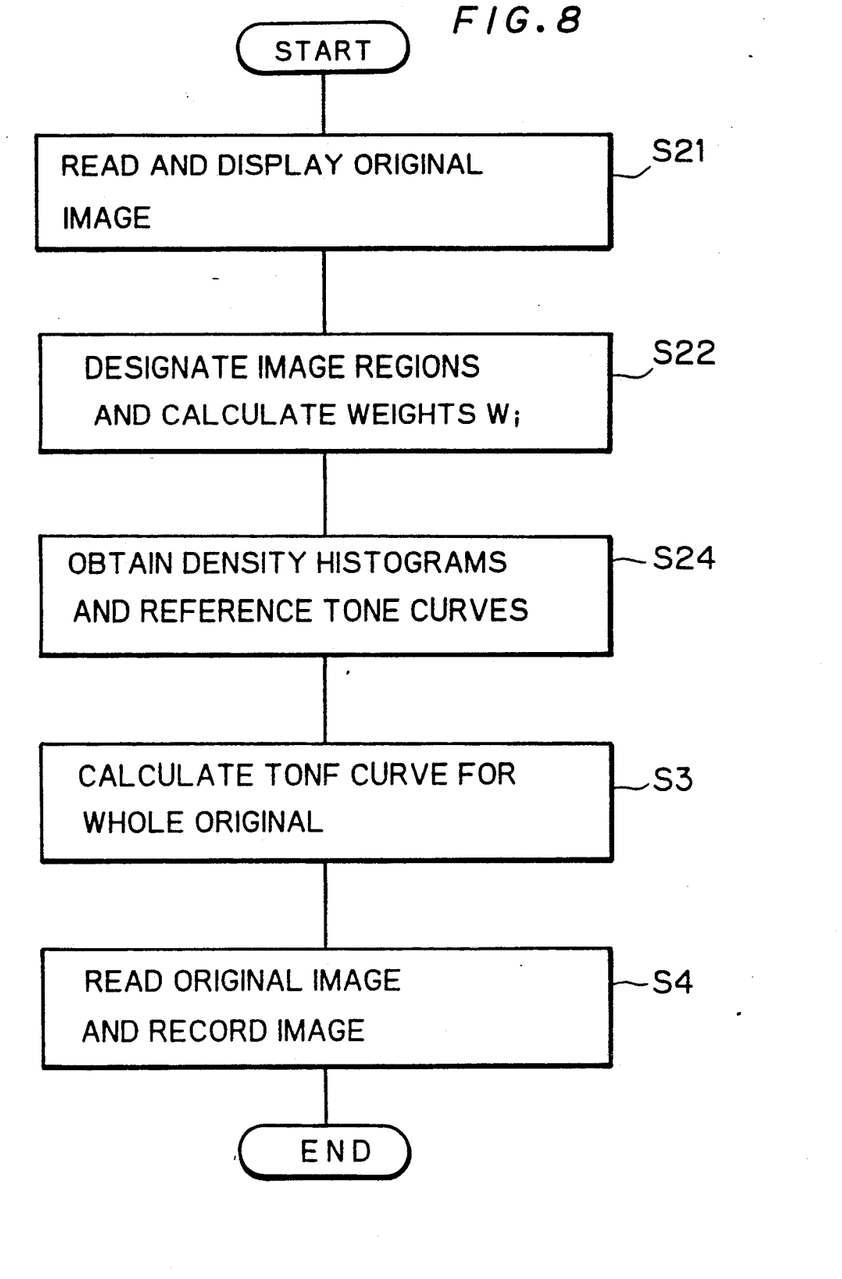
FIG. 8 is a flow chart showing the procedure according to still another preferred embodiment of the present invention.

FIG. 8 is a flow chart showing the procedure of still another preferred embodiment using the scanner system of FIG. 6. In this procedure, the steps S1 and S23 for preparing the reference tone curves in FIG. 6 are absent. Instead the step S24 is inserted between the steps S22 and S3.

In step S24, the CPU 51 produces each density histogram for the image regions $R_1$ and $R_2$ in the original image and produces the reference tone curves $f_1(x)$ and $f_2(x)$ appropriate to the image regions $R_1$ and $R_2$ respectively based on the density histograms. A method of finding the density histograms and the tone curves $f_1(x)$ and $f_2(x)$ based on the density histograms are disclosed, for example, in U.S. Pat. No. 4,792,979, which disclosure is incorporated herein. In step S3, based on the tone curves $f_1(x)$ and $f_2(x)$ thus found, a tone curve $f_d(x)$ appropriate to the whole original image is found according to Equation (1) or (2).

As disclosed in U.S. Pat. No. 4,792,979, the reference tone curves $f_1(x)$ and $f_2(x)$ may be found based on other statistical values representing the density distribution state of the original image rather than the density histogram.

According to the procedure of FIG. 8, there is no need to prepare a large number of reference tone curves in advance. The reference tone curves appropriate to the respective image regions in the original image are not required to be selected by the operator, but are produced automatically. Therefore, an appropriate tone curve can be obtained independently of the operator's ability.

The present invention is applicable not only to a color scanner but also to a monochrome scanner.

In the above-mentioned preferred embodiments, the original image has been divided into two image regions $R_1$ and $R_2$. However, the original image may be divided into three image regions or more. In general, when the original image is separated into m-number of image regions, where m is an integer larger than one, the tone curve $f_d(x)$ is calculated by means of the following equation instead of Equation (1):

$$f_d(x) = \sum_{i=1}^{m} W_i f_i(x) / \left( \sum_{i=1}^{m} W_i \right) \quad (3)$$

Furthermore, the tone curve may be obtained by taking the whole image of the original as one image region and taking a specified portion included therein, e.g., the main subject portion, as another image region. When the whole image to be processed is divided into three image regions or more, for example, the weight of the background region may be set to zero.

D. Conclusion

As described above, according to the present invention, an image is divided into a plurality of image regions, and reference tone curves appropriate to the respective image regions are determined and averaged with weights. When it is desired to emphasize the tone of a partial image region a curve approximate to the reference tone curve suited to the partial image region is employed as a tone curve of the whole image. Therefore, the tone curve suitable for appropriately reproducing the tone of the partial region designated in the original image can be obtained easily.

Although the present invention has been described and illustrated in detail, it is to be clearly understood that the same is by way of illustration and example only and is not to be taken by way of limitation. The spirit and scope of the present invention should be limited only by the terms of the appended claims.

I claim:

1. A method of producing a corrected image from an original image, comprising the steps of:
   (a) preparing and storing a plurality of reference tone curve signals corresponding to a plurality of gradation characteristics;
   (a-1) scanning said original image to produce an original image signal;
   (b) designating a plurality of image region signals from said original image, corresponding to image regions within said original image;
   (c) selecting respective reference tone curve signals for said designated image region signals from among said plurality of reference tone curve signals;

(d) designating weight values for said respective reference tone curve signals which were selected;
(e) combining said respective reference tone curve signals in cooperation with said weight values to thereby obtain a combined tone curve signal;
(f) setting said combined tone curve signal in a signal converter;
(g) converting said original image signal through said combined tone curve signal set in said signal converter to produce a converted image signal;
(h) generating a halftone dot signal as a function of said converted image signal; and
(i) recording a halftone dot image on a photosensitive material as a function of said halftone dot signal, to thereby produce a corrected image signal representing said corrected image.

2. The method of claim 1, wherein the step of (a) comprises the step of:
   (a-1) preparing said plurality of reference tone curve signals on the basis of reference images having different tones.

3. The method of claim 2 wherein the step of (c) comprises the steps of:
   (c-1) providing a menu table representing said different tones;
   (c-2) selecting a tone in said menu table for each of said plurality of image region signals; and
   (c-3) extracting a reference tone curve signal corresponding to said tone for each of said plurality of image region signals to thereby obtain said respective reference tone curve signals for said designated image region signals.

4. The method of claim 1, wherein the step (b) comprises:
   (b-1) dividing said original image into said plurality of image region.

5. The method of claim 4, wherein the step (b-1) comprises the steps of:
   (b-1-1) displaying said original image on display means; and
   (b-1-2) defining boundaries between said plurality of image being region signals on original image displayed.

6. The method of claim 5, wherein the step (b-1-2) comprises the step of: tracing said boundaries with cursor means.

7. The method of claim 6, wherein the step (b-1-2) comprises the steps of:
   designating a center position of an image region on said original image being displayed;
   designating a size of said image region; and
   obtaining one of said plurality of image signals from said image region having said center portion and said size.

8. The method of claim 1, wherein the step (d) comprises the steps of:
   (d-1) selecting one image region signal from among said plurality of image region signals;
   (d-2) providing a first weight value to said one image region signal which was selected; and
   (d-3) providing second weight values to image region signals not selected, where said first weight value is larger than said second weight values.

9. The method of claim 1, wherein the step (d) comprises the steps of:

(d-1) obtaining a ratio between respective areas of a plurality of image regions corresponding to said plurality of image region signals; and
(d-2) determining said weight values such that a ratio between said weight values is equal to said ratio between said respective areas of said plurality of image regions.

10. The method of claim 1, wherein said combined tone curve signal is obtained according to the following equation:

$$f_d(x) = \{W_1 f_1(x) + W_w f_2(x)\}/(W_1[1] + W_2)$$

where:
$F_d(x)$ is said combined tone curve signal;
$f_1(x)$ and $f_2(x)$ are said respective reference tone curve signals;
$0 \leq x \leq x_n$, $x_n$ designating the maximum value of the input density.

11. The method of claim 1, wherein said combined tone curve signal is obtained according to the following equation:

$$f_d(x) = (1-a)f_1(x) + af_2(x)$$

where:
$f_d(x)$ is said combined tone curve signal;
$f_1(x)$ and $f_2(x)$ are said respective reference tone curve signals; and
$0 < a < 1$.

12. The method of claim 1, wherein said combined tone curve signal is obtained according to the following equation:

$$f_d(x) = \sum_{i=1}^{m} W_i f_i(x) / \left(\sum_{i=1}^{m} W_i\right)$$

where:
$f_d(x)$ is said combined tone curve signal;
$f_i(x)$ for $i = 1, 2, \ldots, m$ are said respective reference tone curve signals;
$W_i$ for $i = 1, 2, \ldots, m$ are said weight values.

13. A method of producing a corrected image from an original image, comprising the steps of:
(a) designating a plurality of image regions on said original image;
(b) determining respective statistical distributions of density on said plurality of image regions;
(c) obtaining respective reference tone curve signals for said plurality of image regions as a function of said respective statistical distributions;
(d) designating weight values for said respective reference tone curve signals;
(e) combining said respective reference tone curve signals in cooperation with said weight values to thereby obtain a combined tone curve signal;
(f) setting said combined tone curve signal in a signal converter means;
(g) obtaining an original image signal representing a gradation on said original image and converting said original image signal in accordance with said combined tone curve signal set in said signal converter means;
(h) generating a halftone dot signal as a function of said converted image signal; and p1 (i) recording a halftone dot image on a photosensitive material as a function of said halftone dot signal, to thereby produce a corrected image signal representing said corrected image.

14. The method of claim 13, wherein the step (b) comprises the step of:
   (b-1) obtaining a respective density histogram on said plurality of image regions.

15. The method of claim 13, wherein the step (a) comprises the step of:
   (a-1) dividing said original image into said plurality of image regions.

16. The method of claim 15, wherein the step (a-1) comprises the steps of:
   (a-1-1) displaying said original image on display means; and
   (a-1-2) defining boundaries between said plurality of image regions on said original image being displayed.

17. The method of claim 16, wherein the step (a-1-2) comprises the step of:
   tracing said boundaries with cursor means.

18. The method of claim 17, wherein the step (a-1-2) comprises the steps of:
   designating a center position of an image region on said original image being displayed;
   designating a size of said image region; and
   obtaining one of said plurality of image regions as said image region having said center position and said size.

19. The method of claim 13, wherein the step (d) comprises the steps of:
   (d-1) obtaining a ratio between respective areas of said plurality of image regions; and
   (d-2) determining said weight values such that a ratio between said weight values is equal to said ratio between said respective areas of said plurality of image regions.

20. The method of claim 13, wherein the step (d) comprises the steps of:
   (d-1) selecting one image region from among said plurality of image regions;
   (d-2) providing a first weight value to said one image region which was selected; and
   (d-3) providing second weight values to image regions not selected, where said first weight value is larger than said second weight values.

21. An apparatus for recording a halftone dot image on a photosensitive material, comprising:
   (a) an image scan reader for photoelectrically reading an image of an original to obtain an image signal for each pixel on said original image;
   (b) memory means for storing a plurality of reference tone curves previously determined;
   (c) display means for inputting said image signal and displaying said image of said original;
   (d) means for determining a plurality of image regions on said display image of said original;
   (e) means for selecting respective tone curves for said plurality of image regions among said plurality of reference tone curves;
   (f) means for designating weight values for said respective reference tone curves;
   (g) means for calculating a weighted average of said respective reference tone curves in cooperation with said weight values to obtain a combined tone curve;
   (h) signal converter means for converting said image signal into a converted image signal through said combined tone curve;
   (i) dot generating means for generating a halftone dot signal as a function of said converted image signal; and
   (j) an image scan recorder for recording a halftone dot image on a photosensitive material as a function of said halftone dot signal.

22. The apparatus of claim 21, wherein said means (f) comprises:
   (f-1) means for obtaining a ratio between respective areas of said plurality of image regions; and
   (f-2) means for determining said weight values under the condition that a ratio between said weight values is equal to said ratio between said respective areas.

23. An apparatus for recording a halftone dot image on a photosensitive material, comprising:
   (a) an image scan reader for photoelectrically reading an image of an original to obtain an image signal for each pixel on said original image;
   (b) display means for inputting said image signal and displaying said image of said original;
   (c) means for determining a plurality of image regions on said displayed image of said original;
   (d) means for obtaining respective density histograms on said plurality of image regions as a function of said image signal;
   (e) means for determining respective reference tone curves for said plurality of image regions as a function of said respective density histograms;
   (f) means for obtaining weight values for said respective reference tone curves;
   (g) means for calculating a weighted average of said respective reference tone curves in cooperation with said weight values to obtain a combined tone curve;
   (h) signal converter means for converting said image signal into a converted image signal through said combined tone curve;
   (i) dot generator means for generating a halftone dot signal as a function of said converted image signal; and
   (j) an image scan recorder for recording a halftone dot image on a photosensitive material as a function of said halftone dot signal.

* * * * *